Figure 1:
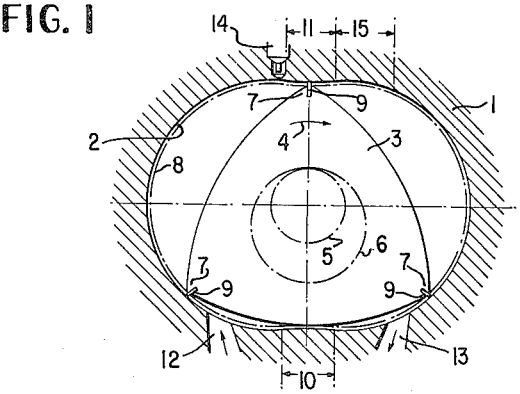

July 27, 1965   WOLF-DIETER BENSINGER   3,196,848
ROTARY PISTON ENGINE
Filed Jan. 24, 1962

INVENTOR.
WOLF-DIETER BENSINGER
BY Dicke and Craig
ATTORNEYS.

United States Patent Office
3,196,848
Patented July 27, 1965

3,196,848
ROTARY PISTON ENGINE
Wolf-Dieter Bensinger, Stuttgart-Unterturkheim, Germany, assignor to Daimler-Benz Aktiengesellschaft, Stuttgart-Unterturkheim, Germany
Filed Jan. 24, 1962, Ser. No. 168,877
Claims priority, application Germany, Jan. 27, 1961, D 35,274
6 Claims. (Cl. 123—8)

The present invention relates to a rotary-piston engine, especially to a rotary-piston internal combustion engine in which there is disposed, within a housing, a piston which together with the sealing strips or vane members arranged thereat parallelly to the axis of the piston slides along the internal boundary of the housing, whereby this internal boundary is disposed at an equidistant distance to the contour of the outer envelope of all positions of the piston relative to the housing, and in which the internal boundary of the housing is provided with at least one zone in proximity to or approaching more closely the axis thereof.

In practical operation of internal combustion engines of this type, it has been noted that within the areas of the zones of the internal boundary more closely approaching the axis there occur periodic places of wear along the internal boundary thereof, so-called chatter-marks, which are caused by the sealing strips or vane members and which, in turn, cause sealing losses and therewith power and output losses.

Within the areas of the zones approaching the axis of the housing or of the driven or output shaft, the gas and inertia forces occurring at the sealing strips or vane members in such internal combustion engines are relatively small or even negative so that, within these zones, the sealing strips or vane members do not remain in abutment against the internal boundary of the housing. The spacing resulting therefrom with respect to the internal boundary is overcome only in an impact-like sudden manner when the gas forces and inertia forces again become larger. The sealing vane members thereby impinge with great force against the internal boundary of the housing and as a result thereof are elastically thrown back therefrom, i.e., bounce back from the internal boundary. This operation repeates itself several times and is influenced adversely by the increase in distance of the internal boundary to the sealing vane members which occurs as a result of heating of the housing from the inside toward the outside and as a result of expansion of the housing.

There is achieved by the present invention which essentially consists in decreasing, within an area following the zone of the internal boundary of the housing more closely approaching the axis or disposed shortly behind the same, the distance between the internal boundary of the housing and the contour of the outer envelope of all positions of the piston so that the sealing ledge members, guided inwardly within the area of small gas and inertia forces, are no longer able to traverse large paths in the outward direction at the beginning of the following or adjoining area of larger gas and inertia forces. The impact path is thereby reduced and the impact energy decreased.

Whereas according to the present invention, on the one hand, uncontrollable movements of the sealing vane members leading to wear occurrences are avoided, there is, on the other, additionally achieved by the present invention that the sealing strips or vane members which under other conditions remain in constant abutment against the internal boundary of the housing, are forced by the decrease of the distance of the internal boundary to the contour of the outer envelope of all positions of the piston relative to the housing into a controlled relative movement with respect to the piston so that the sealing strips or vane members cannot become stuck but remain free, i.e., freely movable in the interest of good seal.

According to a preferred embodiment of the present invention, it is possible for purposes of achieving the same objects with an internal combustion engine in which a piston provided with at least three corners is supported eccentrically and parallelly to the axis on the driven or output shaft within the housing having, in cross section, a multi-arched internal boundary provided with at least two zones in proximity to or more closely approaching the axis of the housing, which piston rotates by means of a transmission at a predetermined ratio to the rotational speed of the driven or output shaft and in which at least three working chambers are formed for which there is arranged an inlet aperture for the fresh gases common to all of the working chambers within the housing located a small distance following a zone in proximity to the axis as viewed in the direction of rotation of the piston and an outlet aperture for the burned gases within the housing located, in the aforementioned direction of rotation, a small distance in front of the zone following the next zone in proximity to the axis, to arrange the internal boundary of the housing rotated forwardly in the direction of rotation of the piston about the center longitudinal axis of the engine by a slight angular amount, for example, by 0.5° to 1° with respect to the contour of the outer envelope of all positions of the piston. The sealing strips or vane members are thereby displaced out of the grooves outwardly thereof by a small amount prior to reaching a respective zone in proximity to the axis within the area of large gas and inertia forces and are guided thereupon inwardly within the area of the zone in proximity to the axis under small gas and inertia forces, and more particularly approximately by double the amount of the path which the sealing strips or vane members have traversed in the outward direction. Consequently, there is imparted to the sealing strips or vane members a movement in the inward direction which prevents a lifting off from the internal boundary of the housing. In case any lifting action takes place nevertheless, the impact path is considerably reduced thereby. The sealing strips or vane members again leave the grooves thereof, i.e., are displaced out of the grooves in the outward direction within the following area of high inertia forces.

Accordingly, it is an object of the present invention to provide a rotary-piston internal combustion engine of the type mentioned hereinabove which effectively eliminates, by simple and inexpensive means, the disadvantages and shortcomings encountered in the prior art constructions.

It is another object of the present invention to provide a rotary-piston internal combustion engine having sealing elements disposed in the apices of the piston in which wear along the internal boundary of the housing causing so-called chatter marks is effectively eliminated thereby also avoiding compression losses and losses in the output of the engine.

Another object of the present invention resides in the provision of a rotary-piston internal combustion engine in which the internal boundary of the housing and the position and location of the seals in the rotary piston are so correlated to each other as to prevent any periodic chattering of the seals and which in particular prevents repeated periodic impingements and elastic rebouncing of the seals against and from the internal boundary of the engine housing, respectively.

Still a further object of the present invention resides in the provision of a rotary-piston internal combustion engine in which the path traversed by the seals when passing from an area of small gas and inertia forces to an area of large gas and inertia forces and vice versa is reduced to thereby also reduce the impact energy.

Still another object of the present invention resides in the provision of a rotary piston internal combustion engine in which the seal elements in the piston are controllably guided to assure constant abutment thereof against the internal boundary of the housing.

A further object of the present invention resides in the provision of a sealing arrangement for the piston of a rotary piston internal combustion engine which is so arranged and constructed as to assure at all times freedom in the movements of the sealing members in the approximately radial inward and outward directions.

Figure 2:
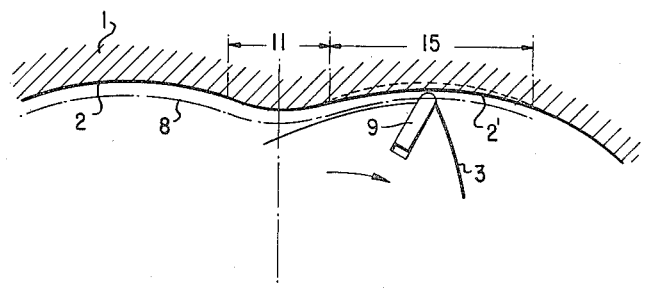
Figure 3:
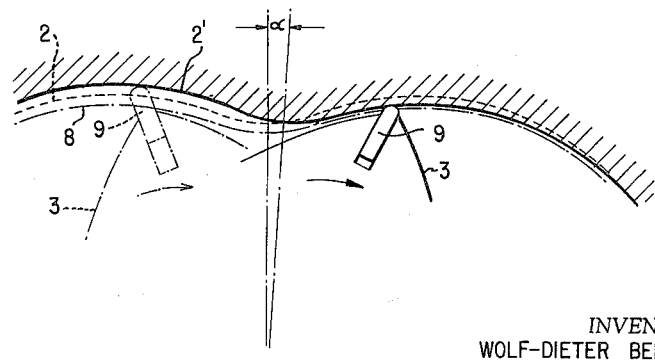

These and other objects, features and advantages of the present invention will become more obvious from the following description when taken in connection with the accompanying drawing which shows, for purposes of illustration only, two embodiments in accordance with the present invention, and wherein FIGURE 1 is a schematic cross sectional view through a rotary piston internal combustion engine of known construction;

FIGURE 2 is a partial schematic cross sectional view, on an enlarged scale, of a zone in proximity to the longitudinal housing axis of the internal boundary of the housing provided with a change in the internal boundary thereof according to a first embodiment of the present invention, and FIGURE 3 is a partial schematic cross sectional view, also on an enlarged scale, of a zone in proximity to the longitudinal housing axis of the internal boundary of the housing with a change in the internal boundary thereof according to a second embodiment of the present invention.

Referring now to the drawing wherein like reference numerals are used throughout the various views to designate corresponding parts, and more particularly to FIGURE 1, reference numeral 1 designates therein the housing of a known internal combustion engine which is provided with a two-arched internal boundary 2. The triangularly-shaped piston 3 is arranged within the housing 1 to rotate in the direction of arrow 4 and is supported on an output shaft eccentrically and parallelly to the axis of the output shaft whereby the output shaft is disposed coaxially to the internal boundary 2, that is, coaxially to the longitudinal axis of the engine housing. The piston 3 carries out a relative movement to the output shaft by means of a pinion 5 rigidly secured to a housing side-wall and of a hollow gear wheel 6 in meshing engagement with the pinion 5 and is arranged along one side of the piston 3. During this relative movement, the corners 7 of the piston 3 describe a curved path 8 which represents the outer envelope of all positions of the piston 3 relative to the housing 1. The sealing strips or vane members 9 arranged within the corners 7 of the piston 3 and extending parallelly to the axis of the piston glide during the movement of the piston 3 along the internal boundary 2 which is disposed at an equidistant distance to the path 8 and which shows the two zones 10 and 11 disposed closer to the axis, i.e., more closely approaching the axis of the housing or output shaft. The inlet aperture 12 for the fresh gases is arranged within the housing 1 shortly behind or following the zone 10 in proximity to the housing axis as viewed in the direction of rotation of the piston whereas the outlet aperture 13 is arranged ahead of the zone 10. The ignition or spark plug 14 is disposed within the area of the zone 11 also disposed in proximity to the longitudinal housing axis. The zones 10 and 11 disposed in proximity to the axis of the engine are areas in which the gas and inertia forces acting on the sealing strips or vane members 9 are relatively small. Particularly within the area 15 of the internal boundary 2 which adjoins in the direction of rotation of the piston 3 the zone 11 in proximity to the engine axis, there occur frequently periodic places of wear, so-called chatter marks along the internal boundary because additionally to the inertia forces which throw the sealing strips or vane members 9, after an eventual separation thereof from the internal boundary within the area of the zone 11 in proximity to the axis, subsequently in the outward direction against the internal boundary 2 within the area 15, considerable gas forces caused by the combustion process act on the sealing ledge members within this area.

In the first embodiment according to the present invention as shown in FIGURE 2 of the drawing, the aforementioned disadvantageous movements of the sealing ledge members 9 cannot occur. The internal boundary, within the area 15 thereof adjoining in the direction of rotation of the piston 3 the zone 11 in proximity to the axis of the internal boundary 2, does not extend corresponding to the path indicated in dash line at an equidistant distance to the path 8 which represents the outer envelope of all positions of the piston, but is, as shown by the full line 2′, displaced more closely to the path 8. The sealing vane members 9 sliding along the internal boundary 2 and 2′ are therefore gradually forced inwardly within the area 15 so that a movement is imparted thereto which precludes a lifting off from the internal boundary 2 within the endangered area 15.

In the embodiment according to FIGURE 3, the internal boundary does not assume an equidistant position to the path 8 but instead is rotated forwardly with respect to the path 8, in the direction of rotation of the piston 3, by a small angular amount α, for example, in practice by α=0.5° to 1.0° with the center longitudinal axis of the engine serving as imaginary point of rotation. The extent of the rotated internal boundary is indicated in FIGURE 3 by the full line 2′. The dash line 2 shows the internal boundary equidistant to the path 8.

Within the area of larger gas and inertia forces ahead of the zone in proximity to the axis having the area of smaller gas and inertia forces the sealing vane member 9 moves, for example, in the position of the piston 3 indicated in dash and dot lines, by a small amount, for example, 0.3 to 0.5 mm. outwardly toward the internal boundary 2′. Within the area of the small gas and inertia forces, the sealing vane member 9 is guided inwardly as illustrated, for example, by the position of piston 3 shown in full line, and more particularly by an amount double the indicated amount, namely approximately by 0.6 to 1.0 millimeter. As a result thereof, there is imparted to the sealing vane member 9 an inwardly directed movement which precludes a lifting off from the internal boundary 2′. However, if a lifting off should take place nevertheless, the impact path is at least strongly reduced thereby. Within the area of large gas and inertia forces adjoining the area of small gas and inertia forces the sealing vane member again moves out of the groove thereof and the interplay recommences.

As a result of the change of the equidistant distance of the internal boundary of housing to the contour of the external envelope of all positions of the piston in accordance with the present invention, not only the places of wear at the internal boundary caused by the sealing vane members are avoided but also controlled movements of the sealing vane members within the grooves thereof relative to the piston are realized so that a sticking of the sealing ledge members in the grooves thereof is rendered impossible and the sealing vane members are always capable of fulfilling the sealing tasks thereof.

While I have shown and described two embodiments in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. In a rotary piston internal combustion engine of the type including an engine housing having a longitudinal axis and in which there is arranged within the housing a piston provided with sealing members arranged at the piston parallelly to the piston axis, said longitudinal axis and said piston axis extending substantially parallel to one another, said piston sliding with the sealing members thereof along the internal boundary of the housing, the internal boundary of said housing being disposed at a substantially equidistant distance with respect to the contour of the outer envelope of all positions of said piston to the housing, and in which the internal boundary of the housing is provided with at least one zone approaching said longitudinal axis, the improvement essentially consisting of reducing the distance between said internal boundary and the contour representing the outer envelope of all positions of the piston during rotation thereof within an area of the internal boundary of the housing following the said zone in proximity to the axis, as viewed in the direction of rotation of the piston.

2. A rotary piston internal combustion engine having a longitudinal axis comprising housing means having, in cross section, a curved internal boundary with at least two arches and provided with at least two zones approaching said longitudinal axis, piston means within said housing means having at least three corners, output shaft means having a shaft axis, said piston means being supporting on said output shaft means eccentrically and parallelly to said shaft axis transmission means for rotating said piston means at a predetermined ratio to the rotary speed of said output shaft means, at least three working chambers being effectively constituted by said housing means and piston means, inlet means for the fresh gases within said housing means common to all of said working chambers and disposed a small distance following one of said zones, as viewed in the direction of rotation of the piston means, outlet means for the burned gases within said housing means disposed, in the aforesaid direction of rotation, a small distance ahead of said one zone, and the internal boundary of said housing means being arranged, with respect to the contour of the outer envelope representing all positions of said piston means during rotation thereof, effectively rotated forwardly in the direction of rotation of the piston means about the longitudinal axis of the engine by a slight angular amount.

3. A rotary piston internal combustion engine having a longitudinal axis, comprising housing means having, in cross section, a curved internal boundary with at least two arches and provided with at least two zones approaching said longitudinal axis, piston means within said housing means having at least three corners, output shaft means having a shaft axis, said piston means being supported on said output shaft means eccentrically and parallelly to said shaft axis, transmission means for rotation said piston means at a predetermined ratio to the rotary speed of said output shaft means, at least three working chambers being effectively constituted by said housing means and piston means, inlet means for the fresh gases within said housing means common to all of said working chambers and disposed a small distance following one of said zones, as viewed in the direction of rotation of the piston means, outlet means for the burned gases within said housing means disposed, in the aforesaid direction of rotation, a small distance ahead of said one zone, and the internal boundary of said housing means being arranged, with respect to the contour of the outer envelope of all positions representing said piston means during rotation thereof, effectively rotated forwardly in the direction of rotation of the piston means about the longitudinal axis of the engine by a slight angular amount of between approximately 0.5 to 1.0 degree.

4. A rotary piston internal combustion engine having a longitudinal axis, comprising housing means having, in cross section, a multi-arched internal boundary and provided with at least two zones approaching said longitudinal axis, piston means within said housing means having at least three corners, output shaft means having a shaft axis, said piston means being supported on said output shaft means eccentrically and parallelly to said shaft axis, transmission means for rotating said piston means at a predetermined ratio to the rotary speed of said output shaft means, at least three working chambers being effectively constituted by said housing means and piston means, inlet means for the fresh gases within said housing means common to all of said working chambers and disposed a small distance following one of said zones, as viewed in the direction of rotation of the piston means, outlet means for the burned gases within said housing means disposed, in the aforesaid direction of rotation, a small distance ahead of said one zone, and the internal boundary of said housing means being arranged with respect to the contour of the outer envelope representing all positions of said piston means during rotation thereof at a substantially equidistant distance with respect thereto, said distance being reduced, however, within an area following another one of said zones in the aforementioned direction of rotation of said piston means.

5. In a rotary piston internal combustion engine of the type in which there is arranged within a housing a piston provided with sealing members arranged at the piston parallelly to the axis thereof, said piston sliding with the sealing members thereof along the internal boundary of the housing, the internal boundary of said housing being disposed at a substantially equidistant distance with respect to the contour of the outer envelope of all positions of said piston relative to the housing, and in which the internal boundary of the housing is provided with at least one zone approaching the axis thereof, the improvement essentially consisting of reducing the distance between said internal boundary and the contour of the outer envelope of all positions of the piston within an area of the internal boundary of the housing following the said zone in proximity to the axis, the reduction of the said distance between the internal boundary and the contour of the outer envelope representing all positions of the piston during rotation thereof being realized by arranging said internal boundary relative to said contour effectively rotated by a small angular amount in the forward direction of rotation of the piston about the longitudinal center axis of the engine.

6. A rotary piston internal combustion engine, having a longitudinal axis, comprising housing means, piston means having a piston axis, said piston means being arranged within said housing means and provided with sealing means arranged thereat in groove means substantially parallelly to the piston axis, said sealing means sliding along the internal boundary of the housing means, the internal boundary of said housing means being disposed at a substantially equidistant distance with respect to the contour of the outer envelope representing all positions of said piston during rotation thereof relative to the housing over at least substantial portions of said internal boundary, said internal boundary being provided with at least one zone approaching said longitudinal axis, and means for reducing the movements of said sealing means in the radially outward direction thereof within the area directly adjoining said one zone as viewed in the direction of rotation of said piston means including surface portions of said internal boundary deviating from the contour of said outer envelope.

References Cited by the Examiner

UNITED STATES PATENTS 2,880,045 3/59 Wankel _____ 123—855
3,102,492 9/63 Bentele et al. _____ 103—130

RICHARD B. WILKINSON, *Primary Examiner.*